United States Patent
Shaffer et al.

(10) Patent No.: US 6,239,881 B1
(45) Date of Patent: *May 29, 2001

(54) APPARATUS AND METHOD FOR SECURING FACSIMILE TRANSMISSIONS

(75) Inventors: Shmuel Shaffer, Palo Alto; William Joseph Beyda, Cupertino, both of CA (US)

(73) Assignee: Siemens Information and Communication Networks, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/771,724

(22) Filed: Dec. 20, 1996

(51) Int. Cl.$^7$ ........................................ H04N 1/00
(52) U.S. Cl. .................................. 358/440; 379/100.06
(58) Field of Search ................................ 358/400, 405, 358/406, 434, 435, 436, 438, 439, 440, 442; 379/100.06, 100.12, 100.14, 102.02

(56) References Cited

U.S. PATENT DOCUMENTS

| | | | | |
|---|---|---|---|---|
| 4,447,676 | * | 5/1984 | Harris | 379/199 |
| 4,667,248 | * | 5/1987 | Kanno | 358/452 |
| 4,922,521 | * | 5/1990 | Krikke et al. | 379/95 |
| 5,168,376 | * | 12/1992 | Motohama | 358/437 |
| 5,216,517 | * | 6/1993 | Kinoshita | 358/400 |
| 5,220,599 | * | 6/1993 | Sasano | 379/142 |
| 5,251,248 | * | 10/1993 | Tokunaga | 379/58 |
| 5,258,998 | * | 11/1993 | Koide | 358/433 |
| 5,274,467 | * | 12/1993 | Takehiro | 358/440 |
| 5,293,253 | | 3/1994 | Kida et al. | 358/440 |
| 5,307,178 | * | 4/1994 | Yoneda | 358/440 |
| 5,379,124 | | 1/1995 | Ikegaya et al. | 358/440 |
| 5,508,819 | * | 4/1996 | Yanagisawa | 358/404 |
| 5,539,811 | * | 7/1996 | Nakamura | 379/94 |
| 5,764,278 | * | 6/1998 | Nagao | 348/15 |
| 5,878,338 | * | 3/1999 | Alperovich | 455/417 |
| 5,963,340 | * | 10/1999 | Kim | 358/450 |

FOREIGN PATENT DOCUMENTS

| | | | |
|---|---|---|---|
| 2 309 137 | 7/1997 | (GB) | H04N/1/32 |
| WO 97/25810 | 7/1997 | (WO) | H04N/1/44 |

* cited by examiner

*Primary Examiner*—Jerome Grant, II

(57) ABSTRACT

An apparatus and method provide for selective transmission and reception of facsimile transmissions. A facsimile call is placed. A station identifier received from the other facsimile during the facsimile call is checked against a stored list of "acceptable" facsimile station identifiers. If a match is found, the transmission is allowed to proceed. If no match is found, the transmission is terminated. Alternatively, the termination can subject to an override by user selection, and the transmission can be allowed to proceed. In an alternative, the station identifier is checked against a list of "unacceptable" facsimile identifiers, and if a match is found the call is terminated; if no match is found, the transmission is allowed to proceed. In other alternatives, a transmission from a facsimile machine whose station identifier is not found on an "acceptable" list, or alternatively, whose station identifier is found on an "unacceptable" list, is stored. In either case, a user views a portion of the stored transmission and decides whether to print the entire transmission.

8 Claims, 6 Drawing Sheets

APPARATUS AND METHOD FOR SECURING FACSIMILE TRANSMISSIONS

FIELD OF THE INVENTION

This invention relates to methods and systems for facsimile transmission.

BACKGROUND OF THE INVENTION

Facsimile transmissions ("faxes") have revolutionized business and personal correspondence. Most businesses and many homes have facsimile machines.

U.S. Pat. No. 5,293,253 to Kida et al., "Kida" herein, discusses ways of preventing unwanted facsimile reception. In part, Kida addresses the issue of "junk faxes", which are unsolicited faxes sent by advertisers to recipients who may prefer not to receive them.

The background section of Kida discusses prior art that accepts facsimile transmission only from certain telephone numbers and for certain terminal identifier codes. In other words, a list is maintained of "acceptable" senders, identified by telephone number and/or terminal identifier. Kida is a variation of that idea. In Kida, the telephone number or terminal identifier of stations to whom faxes are sent are captured. These captured numbers or identifiers are automatically entered on the "acceptable" list. In other words, Kida maintains a list of senders from whom facsimile transmission will be accepted; in particular, faxes are accepted from those to whom faxes are sent.

Kida addresses some problems that facsimile users face. However, users face a host of other problems. Kida addresses blocking the receipt of facsimile transmissions except from known sources. However, a user may wish to accept faxes from unknown sources, as for example, a merchant who receives orders from new customers. At the same time, the user may wish to block faxes from other sources. Or, for example, a user may not know whether a facsimile reception from an unknown source is welcome or unwelcome. Kida is of no assistance with these problems. Furthermore, Kida concerns only preventing the reception of unwanted faxes. Kida nowhere touches upon problems that can arise from unwanted or unintended fax transmission.

Problems with such fax transmission can be serious. Users rely on facsimile transmission for delivering almost any document that can be mailed or hand-delivered. Faxes are acceptable even for court filings. Many businesses routinely rely on faxes for almost all of their correspondence.

Unfortunately, faxes can be misdelivered. The mere fact that a transmission is completed provides no insurance that it has been transmitted to the intended recipient. Confirmation notices are commonly printed upon successful transmission of a fax. The confirmation notice typically indicates the station identifier, the number of pages transmitted, the time of transmission, and whether the transmission was successful. Receipt of a confirmation notice provides further assurance and proof that the transmission occurred in the intended or claimed manner.

However, a confirmation notice is typically printed after transmission. In case of error, it notifies the sender that an error has been made, but only after the fact. Where confidential or sensitive information has been transmitted, after-the-fact knowledge may be too late. In many situations, a user may routinely send facsimile transmissions to a particular telephone number and yet have other transmissions that would be disastrous if sent to those same numbers. For example, a law firm may routinely send faxes to its opposing counsel. Damaging material can be inadvertently faxed to opposing counsel because staff, accustomed to dialing (or auto-dialing) certain numbers, inadvertently perseverates. Similarly, damaging material can inadvertently be faxed to counterparts in a negotiation or other business dealing. Group distribution lists are often programmed into facsimile machines, increasing the chances that one group distribution list might inadvertently be substituted for another.

What is needed is a system that safeguards against facsimile transmission to unintended recipients; that allows a recipient to selectively block transmissions from certain senders; and that aids a recipient in determining whether or not he wishes a facsimile transmission.

SUMMARY OF THE INVENTION

A facsimile machine checks the station identifier of a dialed station before facsimile transmission. If the station identifier matches an identifier on a list of "approved" recipients, the transmission is allowed to go forward. If no match is found, the call is halted before transmission. The sender can then recheck the number to see if he wants to go ahead with transmission.

In one variation, the facsimile machine checks the station identifier against a list of "acceptable" station identifiers and blocks transmission unless the station identifier is found on the list. In another variation, the facsimile machine blocks transmission of a facsimile if the station identifier is found on a list of "unacceptable" station identifiers, The system allows for the option of overriding the transmission block at the user's election. In one variation, any user can remove the block on a case-by-case basis, by for example, an arbitrary keystroke on the keypad. In another variation, only a particular secured sequence of keystrokes will remove the block.

In another embodiment, the facsimile machine checks the station identifier of a sending station before accepting a facsimile. If the station identifier matches an identifier on a list of "unacceptable" senders, receipt is blocked. If no match is found, transmission is accepted.

In another embodiment, the facsimile machine checks the station identifier of a sending station before accepting a facsimile. If the station identifier does not match an identifier on a list of "acceptable" senders, the transmission is received but is stored in memory rather than printed on paper. The station identifier (or other portion of the facsimile) can be checked on a CRT or other display or displayed by printing to enable the recipient to determine whether to print out the entire fax, thereby saving paper.

In another embodiment, the facsimile machine checks the station identifier of a sending station before accepting a facsimile. If the station identifier matches an identifier on a list of "unacceptable" senders, the transmission is received but is stored in memory rather than printed on paper. The station identifier (or other portion of the facsimile) can be checked on a CRT or other display or displayed by printing to enable the recipient to determine whether to print out the entire fax.

DESCRIPTION OF THE PREFERRED EMBODIMENTS

Figure 1:
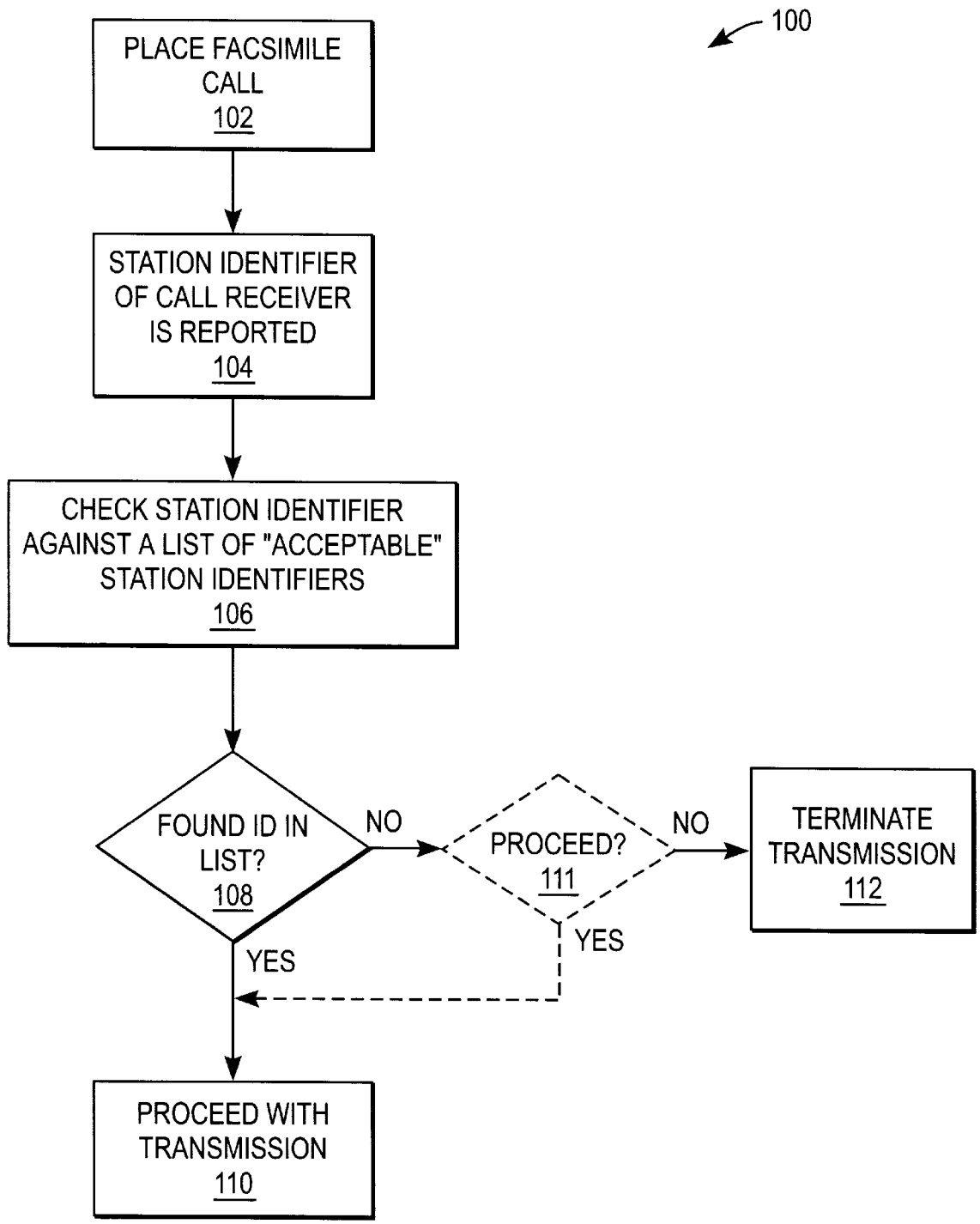
FIG. 1 is a flow chart of a first method in accordance with the present invention.

FIG. 1 shows a first method 100 in accordance with the present invention. A facsimile call is placed, at a step 102. Placing the call involves a user dialing the number of the intended recipient. The dialing may be done automatically, as by a user pressing a "memory re-dial" button. As part of the protocol, the receiving facsimile machine returns a facsimile station identifier to the user's telephone. The station identifier is an identifier that the recipient has programmed into his telephone. The user can program anything he wants into his identifier; it is not checked by any procedure, and in current practice, there is no check between data belonging to the telephone or line and information programmed. For example, John Smith at telephone number (408) 555-1111 could program his facsimile machine so that the identifier reads "The White House, (202) 456-1414 ".

At a step 104, the programmed station identifier is reported to the user's telephone. The identifier is checked, at a step 106, against a list of "acceptable" station identifiers. The list of acceptable station identifiers has been previously prepared by the user. The user can enter the list by hand or can collect a list automatically. The station identifiers of fax machines to which you send faxes or from which you receive faxes can be selected to be automatically captured. The capture of "acceptable" facsimile numbers can also be restricted, as for example by requiring the entry of a coded sequence of keystrokes. In this way, for example, only a supervisor and not a line worker can enter an "acceptable" facsimile number.

At a step 108, it is determined whether a match is found. If the received station identifier matches an entry on the list of acceptable station identifiers, the facsimile is allowed to proceed, at a step 110. If the received identifier does not match an entry on the list, the call is terminated, at a step 112, before facsimile transmission.

In many instances, a user needs the ability to send a facsimile to any other party, but ought to confirm that certain transmissions are intended. For example, in the case of opposing counsel or negotiation partners, facsimiles to the other side are often indispensable; at the same time, inadvertent transmission could be disastrous. In an optional step 111, indicated by dashed lines, a user is given the option to override the transmission termination. This feature allows the transmission but provides a safeguard against inadvertent transmission.

Figure 2:
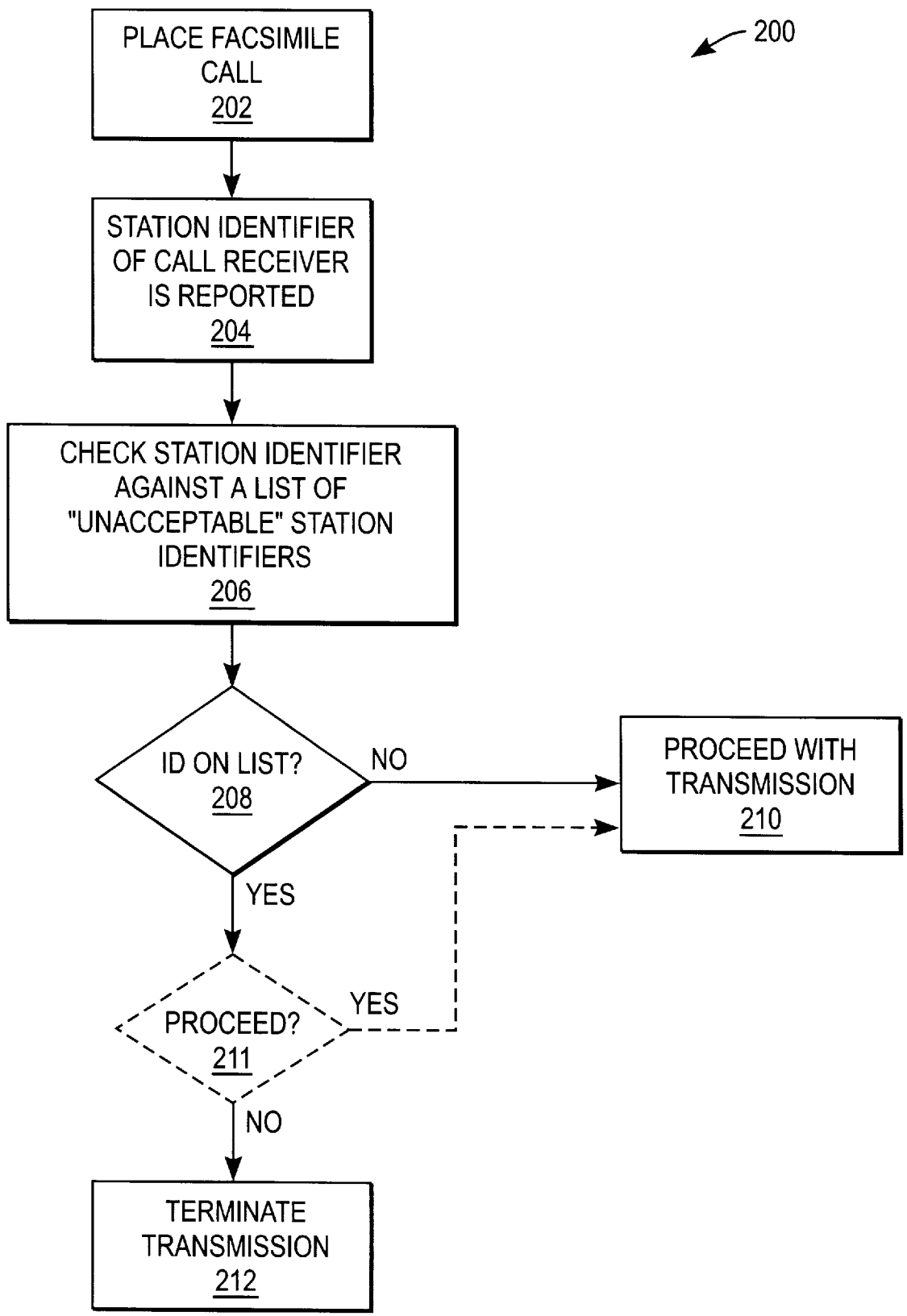
FIG. 2 is a flow chart of a second method in accordance with the present invention.

In another embodiment shown at a method 200, a facsimile station identifier can be used to block facsimile transmission to certain identifiers, as shown in FIG. 2. A call is placed from the user's telephone, at a step 202. A facsimile station identifier is received, at a step 204. The station identifier is checked against a list of "unacceptable" station identifiers, at a step 206. At a step 208, it is determined whether a match is found. If no match is found, the method continues to a step 210, and the call proceeds. If a matching identifier is found on the list, the call is terminated, at a step 212.

The system may include an override feature which queries the user, and allows an override if the user wishes to proceed. The override feature is shown as optional step 211 of FIG. 2, shown in dashed lines.

In any method in accordance with the invention, the user may set the match criteria to require an exact match. Alternatively, the user may specify instances of words or character strings. For instance, a caller faxing something to John Smith at Siemens Business Communication Systems at 555-2222 may specify that any of "Smith", "Siemens", "Business Communication Systems", or the number suffices. In this way, transmission will be approved even if the receiving fax identifies itself by a variant such as "J. Smith, Siemens" or "Siemens Intellectual Property Department".

By checking station identifier rather than dialed number, the method can aid in preventing the transmission of unauthorized facsimiles. Often a business has more than one facsimile number, or a call may be forwarded to another number, or a business's telephone number may have changed. Checking station identifier offers more insurance than checking the number.

The system also helps users who simply want selectively to block facsimile transmission, as for example an employer who wishes to prevent his employees from faxing song requests to a radio station. As discussed above, the station identifier can be an instance of a word or a character string. For example, an employer who wishes to block faxes to radio station KBBQ can enter that character string. A law firm wishing to double check all faxes to opposing counsel Jones Smith can enter "Jones" and "Smith." Upon receipt of a junk fax, the recipient can enter the station identifier provided on the fax and block future transmissions.

Figure 3:
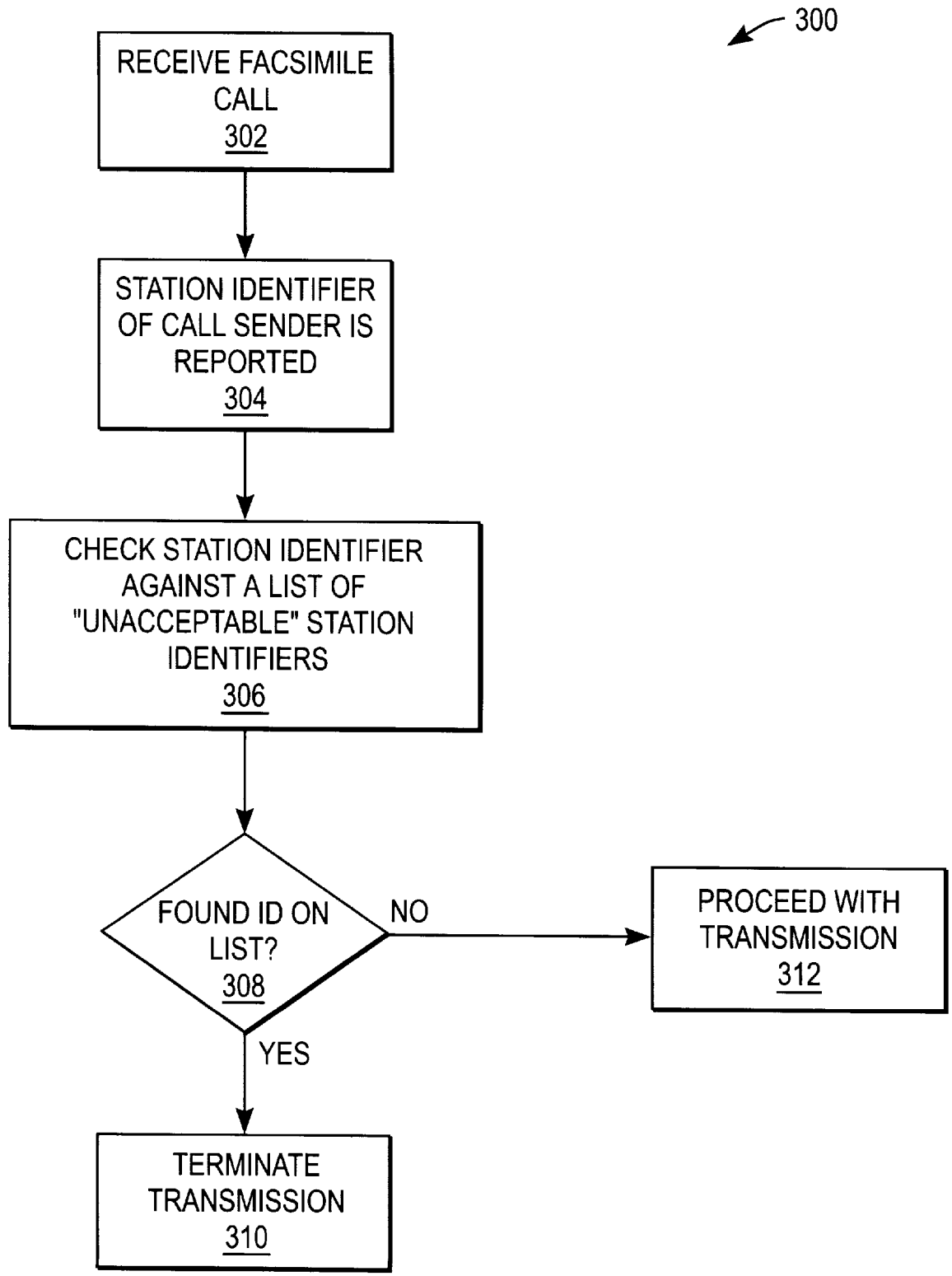
FIG. 3 is a flow chart of a third method in accordance with the present invention.

A method 300 in accordance with the present invention is shown in FIG. 3. A call is received, at a step 302. A facsimile station identifier is received at a step 304, as part of the exchange of information in the protocol. At a step 306, the station identifier is checked against a list of "unacceptable" station identifiers. At a step 308, it is determined whether a match is found. If a match is found, the method proceeds to a step 310, and the call is terminated. If no match is found, the facsimile is allowed to be received, at a step 312.

Figure 4:
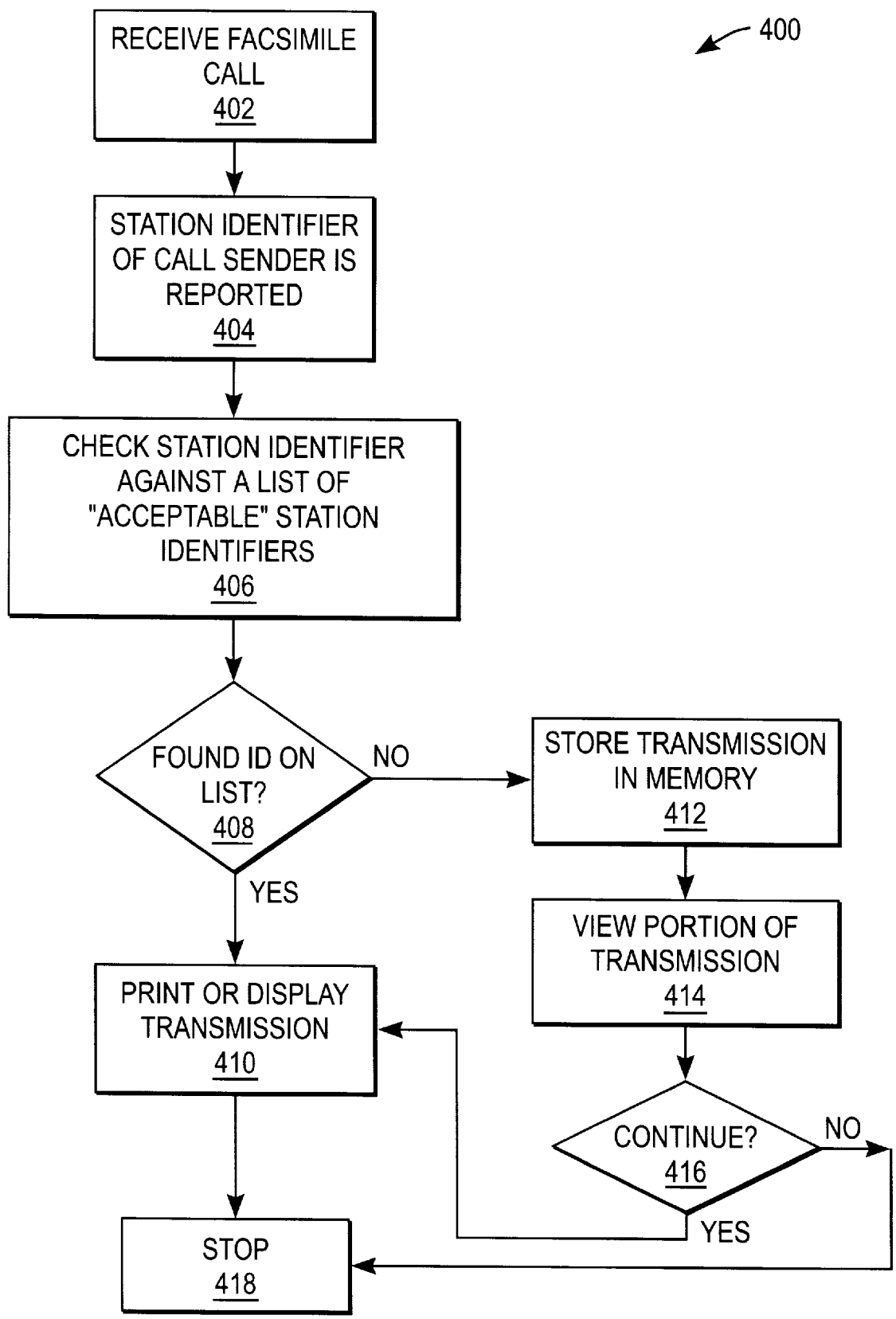
FIG. 4 is a flow chart of a fourth method in accordance with the present invention.
Figure 5:
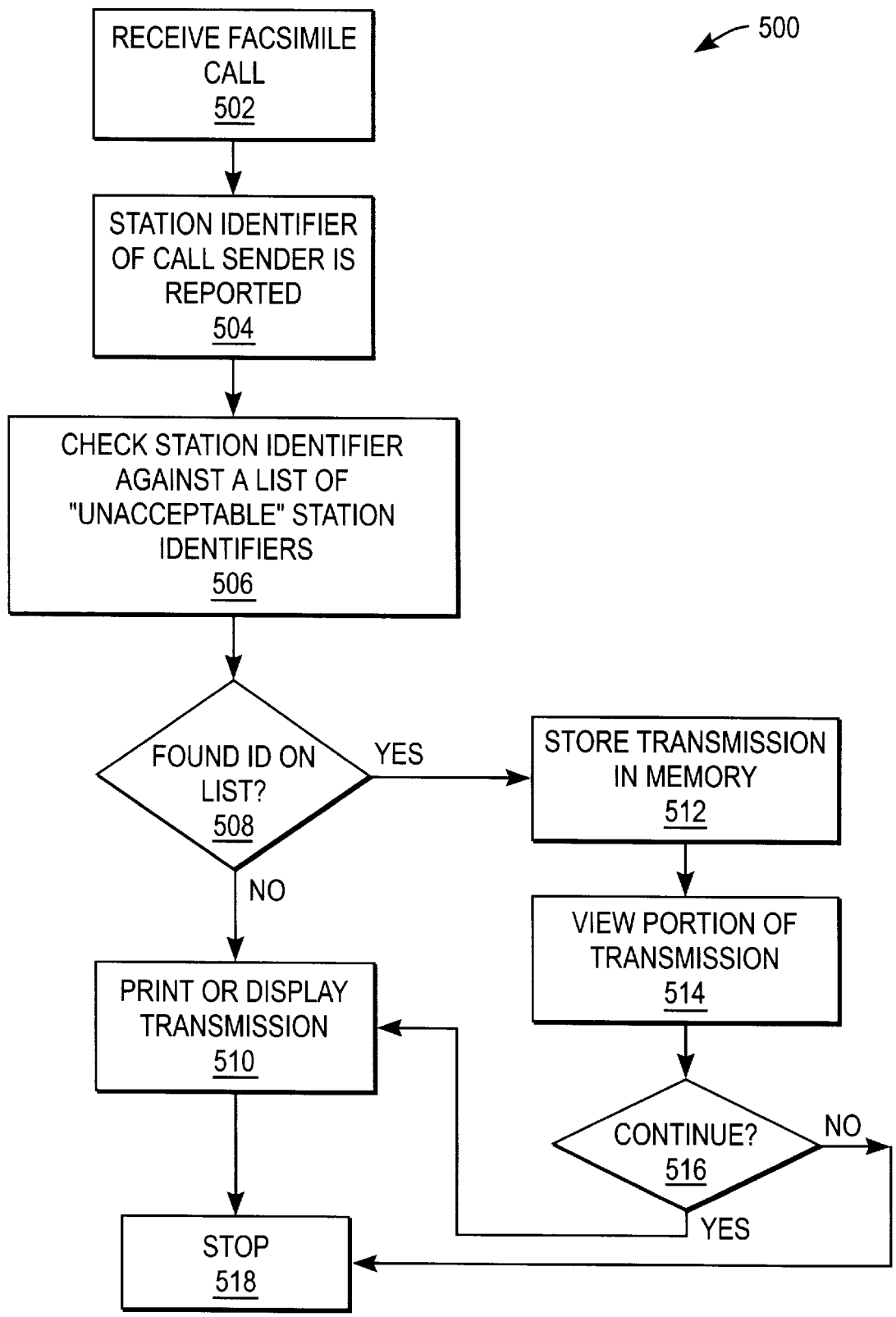
FIG. 5 is a flow chart of a fifth method in accordance with the present invention.

In another variation, shown in FIG. 4, a facsimile transmission from an "unapproved" station is stored in memory, allowing a user to review a portion before deciding whether to print it. The portion reviewed may include the station identifier.

In a method 400, a facsimile call is received at a step 402. A station identifier is received from the sending station at a step 404. The received station identifier is checked against a list of "acceptable" station identifiers at a step 406. If a match is found, at a step 408, the transmission is printed or otherwise displayed, at a step 410. As discussed above, a match for the station identifier can be defined as an exact match, or can be defined as including a character string. When the printing is finished, the method stops, at a step 418.

If no match is found at step 408, the transmission is stored in memory, at a step 412. The user views a portion of the transmission at a step 414. The viewing may be on a display, such as a CRT screen, or can be by printing, as for example, by printing the station identifier or the first five lines of the transmission. After viewing a portion of the transmission, the user decides, at a step 416, whether to continue. If the user chooses to continue, the facsimile transmission is printed out, at step 410. Alternatively, the user can elect to view the transmission on a display. If the user decides not to continue, the method stops, at step 418.

In a method 500, a facsimile call is received at a step 502. A station identifier is received from the sending station at a step 504. The received station identifier is checked against a list of "unacceptable" station identifiers at a step 506. If, at a step 508, no match is found, the transmission is printed, at a step 510. As discussed above, a match for the station identifier can be defined as an exact match, or can be defined as including a character string. When the printing is finished, the method stops, at a step 518.

If a match is found at step 508, the transmission is stored in memory, at a step 512. The user views a portion of the transmission at a step 514. The viewing may be on a display, such as a CRT screen, or can be by printing, as for example, by printing the station identifier or the first five lines of the transmission. After viewing a portion of the transmission, the user decides, at a step 516, whether to continue. If the user chooses to continue, the facsimile transmission is printed out, at step 510. Alternatively, the user can elect to view the transmission on a display. If the user decides not to continue, the method stops, at step 518.

Figure 6:
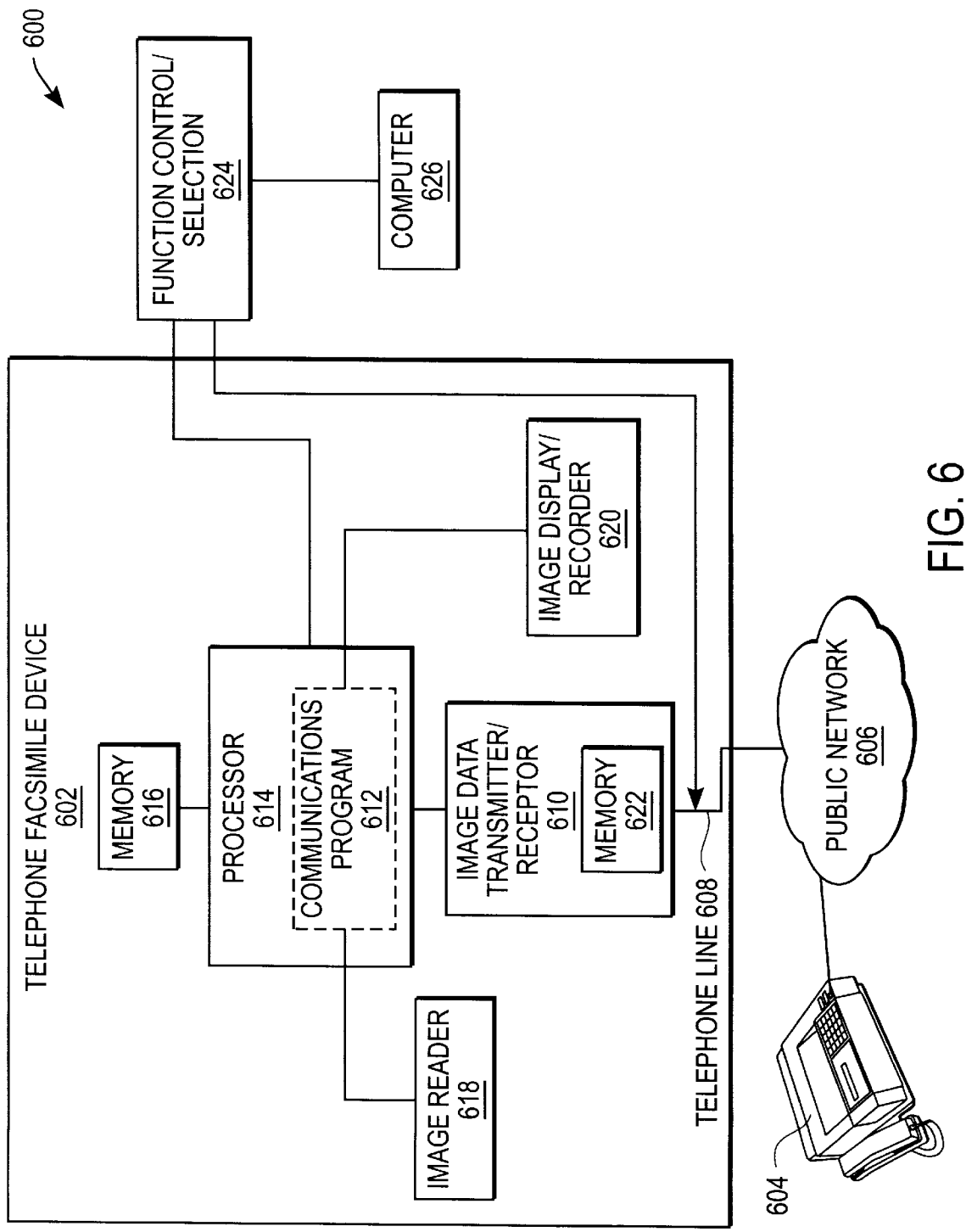
FIG. 6 is a diagram of an apparatus used in accordance with the present invention.

A system 600 in accordance with the present invention is depicted in FIG. 6. A telephone facsimile device 602 is shown in FIG. 6. In the case of facsimile reception, a call from a sender's facsimile device 604 is transmitted via public network 606 and a telephone line 608 to an image data transmitter/receptor 610 within device 602.

As part of the protocol, facsimile device 604 transmits its station identifier to a communications program 612 within a processor 614 of device 602. Processor 614 accesses a stored list of station identifiers in a memory 616, and determines whether the station identifier of receiving facsimile device 604 meets a preselected criterion for transmission, e.g., whether the station identifier is not on a list of "unacceptable" numbers. The reception then proceeds or is terminated depending on whether the criterion is met.

If reception proceeds, the facsimile image data is received by image data transmitter/receptor 610. An image reader 618 transforms the data into a readable image, which is sent, via communications program 612, to an image display and/or recorder 620. The display can include a cathode ray tube or a liquid crystal display. The image recorder can include printing on paper or transparent film. Alternatively, the image can be sent to a memory 622 within image data processor/receptor 610, from which the image can be accessed later via processor 614.

A function control and/or selection component 624 is used to enter the user's selections for facsimile operation. For example, component 624 can include a telephone keypad that allows a user to press certain keys to indicate choices. In this example, the telephone keypad can also connect to a telephone line directly, as for example, allowing the user to dial a telephone number, as shown by the connection of component 624 with telephone line 608. The function/control component 624 can also be connected to or part of a computer system 626.

In one example of function control/selection, a speed-dial button on component 624 is pressed. The signal is transmitted to processor 614, which looks up the corresponding number in memory 616, and dials the number via communications program 612. Recipient's facsimile machine 604 receives the call, and as part of the protocol, transmits its station identifier to communications program 612 via public network 606, telephone line 608, and image data transmitter/receptor 610. Processor 614 accesses a stored list of station identifiers in memory 616, and determines whether the station identifier of receiving facsimile device 604 meets a preselected criterion for transmission, e.g., whether the station identifier is on an "acceptable" list; or alternatively, whether it is not on an "unacceptable" list. The transmission then proceeds or is terminated depending on whether the criterion is met.

Although function control/selection component 624 is schematically illustrated in FIG. 6 as being located outside facsimile device 602, it can be implemented as an integral part of device 602, as for example the telephone keypad portion of the telephone facsimile device discussed above.

While there has been described what is believed to be the preferred embodiments of the invention, those skilled in the art will recognize that other and further modifications may be made thereto without departing from the spirit of the invention. For example, security can be increased using standard encryption techniques. It is intended to claim all such embodiments that fall within the true scope of the invention, which is limited only by the following claims.

What is claimed is:

1. An apparatus for restricting facsimile transmission comprising:

calling station communications control means for initiating a facsimile call;

calling station image data transmission means for transmitting image data via said communications control means, said communications control means receiving station identification data from a receiving station;

calling station memory means for storing the station identification data of selected stations;

such that said communications control means compares the station identification data of the receiving station of a call initiated at the calling station to a first set of station identification data stored in said memory means, said first set identifying a first receiving station, and (a) if a match is found in the first set of data, said communication control means proceeding with the call;

(b) if no match is found, said communication control means comparing the station identification data of the receiving station with a next set of data identifying a next receiving station; and (c) if no match is found, said communication control means terminating the call.

2. The apparatus of claim 1 further including image recording means for recording the image data.

3. The apparatus of claim 2 wherein said image recording means includes paper.

4. The apparatus of claim 2 wherein said image recording means includes a memory means for storing said image data to create stored image data.

5. The apparatus of claim 1 in which at least one of the communications control means, image data transmission means, and memory means is located remotely from the calling station.

6. The apparatus of claim 1 wherein the communication control means repeats step (b) for a predetermined number of sets of data.

7. A method for restricting facsimile transmission comprising:

a calling station communications control means initiating a facsimile call;

a calling station image data transmission means transmitting image data via said communications control means, said communications control means receiving station identification data from a receiving station;

a calling station memory means storing the station identification data of selected stations; and said communications control means comparing the station identification data of the receiving station of a call initiated at the calling station to a first set of station identification data stored in said memory means, said first set identifying a first receiving station, and (a) if a match is found in the first set of data, said communication control means proceeding with the call;

(b) if no match is found, said communication control means comparing the station identification data of the receiving station with a next set of data identifying a next receiving station; and (c) if no match is found, said communication control means terminating the call.

8. The method of claim 7 wherein the communication control means repeats step (b) for a predetermined number of sets of data.

* * * * *